United States Patent
Suzuki (10) Patent No.: US 9,739,211 B2
(45) Date of Patent: Aug. 22, 2017

(54) CONTROL APPARATUS OF INTERNAL COMBUSTION ENGINE

(71) Applicant: Masaru Suzuki, Toyota (JP)

(72) Inventor: Masaru Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 14/433,175

(22) PCT Filed: Oct. 30, 2012

(86) PCT No.: PCT/JP2012/078026
§ 371 (c)(1),
(2) Date: Apr. 2, 2015

(87) PCT Pub. No.: WO2014/068670
PCT Pub. Date: May 8, 2014

(65) Prior Publication Data
US 2015/0247467 A1    Sep. 3, 2015

(51) Int. Cl.
*F02D 13/02*    (2006.01)
*F02D 41/08*    (2006.01)
(Continued)

(52) U.S. Cl.
CPC ...... *F02D 13/0207* (2013.01); *F02D 13/0211* (2013.01); *F02D 13/0219* (2013.01); *F02D 41/0002* (2013.01); *F02D 41/086* (2013.01); *F02D 13/0261* (2013.01); *F02D 13/0269* (2013.01); *F02D 2013/0292* (2013.01); *F02D 2041/001* (2013.01); *F02D 2200/021* (2013.01); *F02M 26/01* (2016.02);
(Continued)

(58) Field of Classification Search
CPC ... Y02T 10/18; Y02T 10/42; F02D 2041/001; F02D 13/0253; F02D 13/0215; F02D 13/0207; F02D 13/0203; F02D 13/0211; F02D 13/0257
USPC ........... 123/344–348, 90.15, 90.17; 701/101, 701/102
See application file for complete search history.

(56) References Cited

U.S. PATENT DOCUMENTS

| | | | |
|---|---|---|---|
| 5,050,543 A * | 9/1991 | Kawamura | F01L 9/04 123/90.11 |
| 6,840,235 B2 * | 1/2005 | Koseki | F01L 1/20 123/568.14 |

(Continued)

FOREIGN PATENT DOCUMENTS

| | | | |
|---|---|---|---|
| JP | 2002-004985 A | 1/2002 |
| JP | 2005-163743 A | 6/2005 |

(Continued)

*Primary Examiner* — Hai Huynh
*Assistant Examiner* — Long T Tran
(74) *Attorney, Agent, or Firm* — Oliff PLC (57) ABSTRACT

An internal combustion engine includes an intake variable lift amount mechanism that changes a maximum lift amount and valve-open period of an intake valve, and an exhaust variable lift amount mechanism that changes a maximum lift amount and valve-open period of an exhaust valve. A control unit executes a process to increase the valve-open period of the intake valve and reduce the valve-open period of the exhaust valve, when idling with a temperature of the internal combustion engine that is equal to or higher than a reference value.

7 Claims, 6 Drawing Sheets

(51) Int. Cl.
*F02D 41/00* (2006.01)
*F02N 11/08* (2006.01)
*F02M 26/01* (2016.01)

(52) U.S. Cl.
CPC ......... *F02N 11/0814* (2013.01); *Y02T 10/142* (2013.01); *Y02T 10/18* (2013.01); *Y02T 10/42* (2013.01)

(56) References Cited

U.S. PATENT DOCUMENTS

| | | | | |
|---|---|---|---|---|
| 7,237,530 B2* | 7/2007 | Miyanoo | ............... | F02D 13/023 |
| | | | | 123/346 |
| 7,607,410 B2* | 10/2009 | Magner | ............... | F02D 13/0261 |
| | | | | 123/348 |
| 7,664,594 B2* | 2/2010 | Kojima | ............... | F02D 11/10 |
| | | | | 123/179.16 |
| 7,742,868 B2* | 6/2010 | Kang | ............... | F02D 13/0265 |
| | | | | 123/299 |
| 7,840,335 B2* | 11/2010 | Akihisa | ............... | F02M 26/01 |
| | | | | 123/48 R |
| 2006/0112919 A1* | 6/2006 | Asada | ............... | F01L 1/32 |
| | | | | 123/90.16 |
| 2008/0190107 A1* | 8/2008 | Ogiso | ............... | F02D 23/02 |
| | | | | 60/602 |
| 2009/0107431 A1* | 4/2009 | Ezaki | ............... | F01L 1/02 |
| | | | | 123/90.16 |
| 2009/0271095 A1* | 10/2009 | Kojima | ............... | F02N 11/0814 |
| | | | | 701/113 |
| 2010/0300386 A1* | 12/2010 | Asami | ............... | F01L 1/3442 |
| | | | | 123/90.15 |
| 2011/0271918 A1* | 11/2011 | Nishikiori | ............... | B60K 6/445 |
| | | | | 123/90.1 |

FOREIGN PATENT DOCUMENTS

| | | |
|---|---|---|
| JP | 2006-138229 A | 6/2006 |
| JP | 2007-077840 A | 3/2007 |
| JP | 2009-085069 A | 4/2009 |
| JP | 2012-132473 A | 7/2012 |

* cited by examiner

CONTROL APPARATUS OF INTERNAL COMBUSTION ENGINE

TECHNICAL FIELD

The invention relates to a control apparatus of an internal combustion engine.

BACKGROUND ART

A mechanism capable of changing a valve-open period and valve timing of a valve is known, as a variable valve mechanism of an internal combustion engine.

For example, an apparatus described in Patent Document 1 includes a variable valve mechanism that changes an valve-open period of an intake valve, and a variable valve mechanism that changes a valve timing of an exhaust valve. Here, when the valve-open period of the intake valve is increased, a valve overlap amount of the intake valve and the exhaust valve may increase and the combustion of an air-fuel mixture may deteriorate. Therefore, the apparatus described in Patent Document 1 inhibits an increase in the valve overlap amount by advancing the valve timing of the exhaust valve and advancing the valve-closing timing, when increasing the valve-open period of the intake valve.

PRIOR ART DOCUMENT

Patent Document

Patent Document 1: Japanese Patent Application Publication No. 2009-85069

SUMMARY OF THE INVENTION

Problems to be Solved by the Invention

However, the valve-opening timing of the exhaust valve is also advanced when advancing the valve timing of the exhaust valve in order to inhibit an increase in the valve overlap amount. Therefore, in some cases, the exhaust valve will open during an expansion stroke.

If the exhaust valve opens during the expansion stroke, energy efficiency that is the ratio of energy that can be used as output of the engine, from among the energy generated by the combustion of the air-fuel mixture, will decrease. This decrease in energy efficiency will end up adversely affecting fuel efficiency and the like, for example.

The object of this invention is to provide a control apparatus of an internal combustion engine that is capable of inhibiting a decrease in energy efficiency of the engine, while inhibiting an increase in a valve overlap amount when increasing a valve-open period of an intake valve.

Means for Solving the Problems

A control apparatus of an internal combustion engine that solves the foregoing problem includes a first variable valve mechanism that changes a valve-open period of an intake valve; a second variable valve mechanism that changes a valve-open period of an exhaust valve; and a control portion that controls driving of the first variable valve mechanism and the second variable valve mechanism. Also, the control portion executes a process to increase the valve-open period of the intake valve and reduce the valve-open period of the exhaust valve.

With this structure, the valve-open period of the intake valve is increased and the valve-open period of the exhaust valve is reduced. When the valve-open period of the exhaust valve is reduced in this way, the valve-closing timing of the exhaust valve is advanced, and the valve-opening timing of the exhaust valve is retarded. Therefore, the valve-closing timing of the exhaust valve is able to be advanced without advancing the valve-opening timing of the exhaust valve. Thus, a decrease in the energy efficiency of the engine is able to be inhibited, while inhibiting an increase in the valve overlap amount when increasing the valve-open period of the intake valve.

Also, in the control apparatus described above, the control portion preferably executes the process when idling with a temperature of the internal combustion engine that is equal to or higher than a reference value.

When the operating state of the internal combustion engine is changed from an idling state to an engine stopped state, and then the internal combustion engine is started, there is a possibility of abnormal combustion such as knocking or pre-ignition occurring when the temperature of the internal combustion engine is high. If the valve-closing timing of the intake valve is retarded and the actual compression ratio is reduced, the temperature of the intake air that is compressed inside the cylinder will be lower, so the occurrence of this abnormal combustion is able to be inhibited. Therefore, with this structure, the valve-open period of the intake valve is increased in preparation for restarting the engine after it is stopped, when the internal combustion engine is idling with the temperature of the internal combustion engine equal to or higher than the reference temperature. When the valve-open period of the intake valve is increased in this way, the valve-closing timing of the intake valve is retarded, so the actual compression ratio when the internal combustion engine is restarted is able to be lowered, and as a result, the occurrence of abnormal combustion when the engine is started is able to be suppressed. Here, when the valve-open period of the intake valve is increased during idling, an internal EGR amount will increase due to the increase in the valve overlap amount. If the engine is stopped while the internal EGR amount is large, startability when the engine is started the next time may deteriorate. However, with this structure, the valve-open period of the exhaust valve is reduced when increasing the valve-open period of the intake valve. Therefore, deterioration of startability due to an increase in the valve overlap amount is also able to be inhibited. An engine temperature at which there is a possibility of abnormal combustion such as knocking or pre-ignition occurring, for example, may be set as the reference value. Also, when performing the process described above, it is preferable to increase the valve-open period of the intake value and reduce the valve-open period of the exhaust valve, compared to when the temperature of the internal combustion engine is lower than the reference value.

Also, in the control apparatus described above, the control portion preferably executes the process before fuel injection is stopped by an engine stop request.

When changing a valve characteristic such as the valve-open period by the variable valve mechanism, a load caused by a reaction force of a valve spring that urges the valve in the valve-closing direction acts on the variable valve mechanism. This load tends to become larger as the valve-open period of the valve becomes longer, or as the engine speed becomes lower. Therefore, a large load will be placed on the variable valve mechanism if the process described above is executed and the valve-open period of the intake valve is increased when the engine speed is at its lowest, i.e., when the engine is stopped. Regarding this, with this structure, the process described above is executed before the fuel injection is stopped by an engine stop request, i.e., while the engine is operating after there is a request to stop the engine until the internal combustion engine stops. Therefore, the load applied to the variable valve mechanism is able to be reduced, compared to when the process is executed after the engine stops. An off operation of an ignition switch for stopping the engine or the like is an example of the engine stop request described above. Also, in an internal combustion engine in which automatic stop and automatic start are performed, an automatic stop condition being satisfied or the like may be an example of the engine stop request.

Also, in the control apparatus described above, the internal combustion engine may be configured such that automatic stop and automatic start are performed, and the engine stop request may be a request for the automatic stop.

In an internal combustion engine in which automatic stop and automatic start are performed, the period of time from after the engine is automatically stopped until it is automatically started is often short compared to when the engine is manually restarted after being manually stopped through an operation of an ignition switch or the like. Therefore, it is highly likely that the engine will be automatically started before the engine temperature sufficiently drops after the engine is automatically stopped. Accordingly, when starting the engine after the engine has been automatically stopped, it is more likely that the abnormal combustion described above will occur, compared to when the engine has been manually stopped. Regarding this, according to this structure, the valve-open period of the intake valve is increased when the engine is automatically stopped, so in an engine in which there is a greater possibility of abnormal combustion occurring, the occurrence of abnormal combustion is able to be appropriately inhibited.

Also, in the control apparatus described above, the control portion preferably increases the valve-open period of the exhaust valve to longer than the valve-open period of the exhaust valve that has been reduced by the process, after the fuel injection is stopped.

According to this structure, the valve-open period of the exhaust valve when starting the engine becomes longer, compared to when the valve-open period of the exhaust valve that was reduced before fuel injection stopped is maintained even after fuel injection stops. Therefore, exhaust gas resistance when the engine is started is reduced, so startability of the engine improves.

MODES FOR CARRYING OUT THE INVENTION

Hereinafter, an example embodiment embodying the control apparatus of an internal combustion engine will be described with reference to FIG. 1 to FIG. 8.

Figure 1:
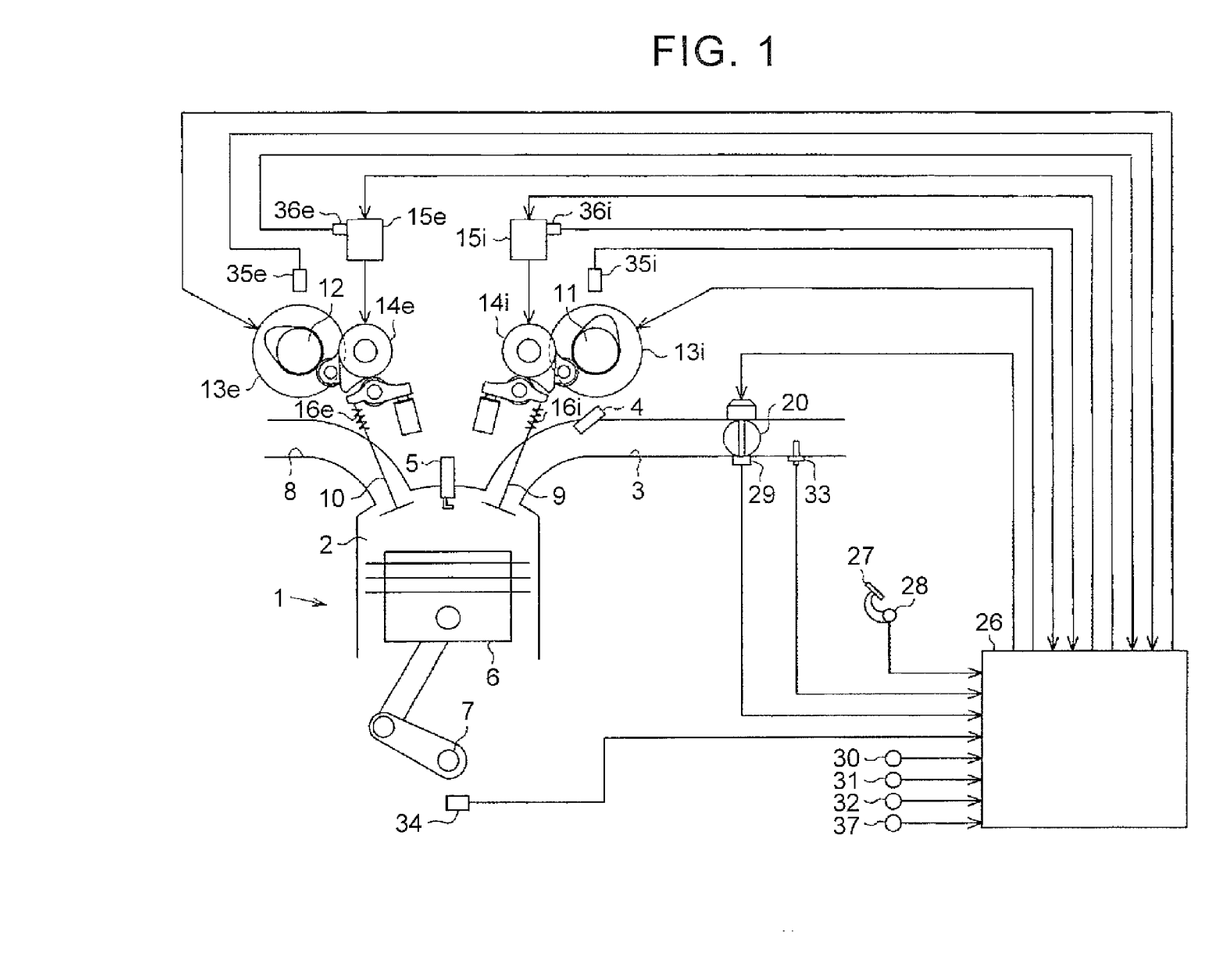
FIG. 1 is an overall block diagram of one example embodiment of a control apparatus of an internal combustion engine.

As shown in FIG. 1, in an internal combustion engine 1, air is drawn into a combustion chamber 2 through an intake passage 3, and fuel injected from a fuel injection valve 4 is supplied to the combustion chamber 2. An air-fuel mixture of air and fuel is ignited by a spark plug 5 in the combustion chamber 2. When the ignited air-fuel mixture combusts, a piston 6 moves down, and a crankshaft 7 of the internal combustion engine 1 rotates. The air-fuel mixture after combustion is discharged from the combustion chamber 2 into an exhaust passage 8 as exhaust gas.

Communication between the combustion chamber 2 and the intake passage 3 is allowed and cut off by an intake valve 9 opening and closing. The intake valve 9 is urged in a valve-closing direction by a valve spring 16$i$. The intake valve 9 opens and closes in synchronization with the rotation of an intake camshaft 11 to which the rotation of the crankshaft 7 is transmitted.

Communication between the combustion chamber 2 and the exhaust passage 8 is allowed and cut off by an exhaust valve 10 opening and closing. The exhaust valve 10 is urged in a valve-closing direction by a valve spring 16$e$. The exhaust valve 10 opens and closes in synchronization with the rotation of an exhaust camshaft 12 to which the rotation of the crankshaft 7 is transmitted.

An intake variable valve mechanism that changes a valve characteristic of the intake valve 9 is provided in the internal combustion engine 1. More specifically, the internal combustion engine 1 includes an intake variable valve timing mechanism 13$i$ that changes the valve timing of the intake valve 9, and an intake variable lift amount mechanism 14$i$ that is driven by an intake valve actuator 15$i$ and changes a maximum lift amount and valve-open period of the intake valve 9. This intake variable lift amount mechanism 14$i$ forms a first variable valve mechanism.

The intake variable valve timing mechanism 13$i$ changes an intake valve timing INVT that is the valve timing of the intake valve 9, by adjusting a relative rotational phase of the intake camshaft 11 with respect to the crankshaft 7.

Figure 2:
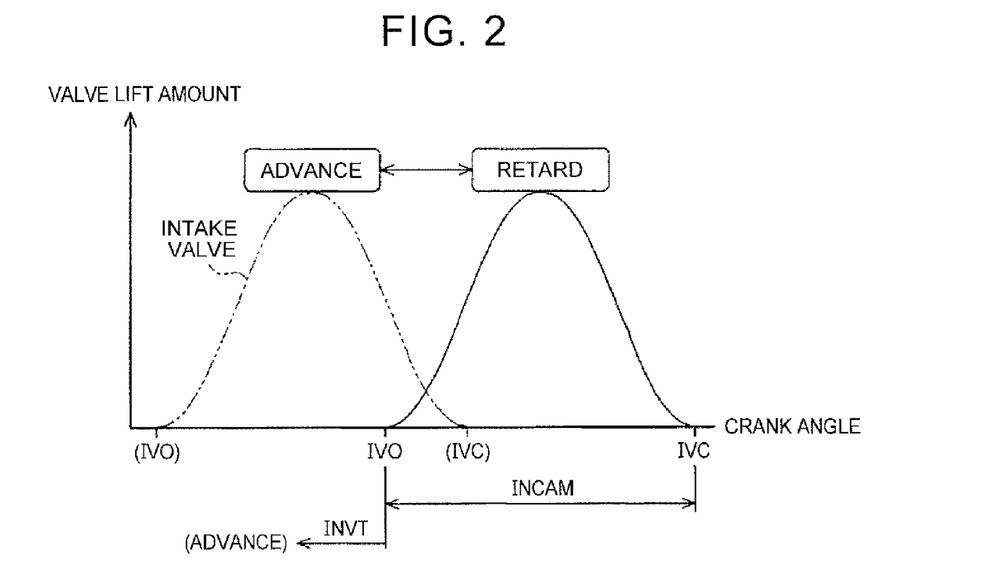
FIG. 2 is a graph showing a valve timing of an intake valve that is changed by an intake variable valve timing mechanism.

As show in FIG. 2, the intake variable valve timing mechanism 13$i$ advances or retards both an intake valve-opening timing IVO that is the valve-opening timing of the intake valve 9, and an intake valve-closing timing IVC that is the valve-closing timing of the intake valve 9, while an intake valve-open period INCAM that is the valve-open period of the intake valve 9 is kept constant. With the intake valve timing INVT, a state in which the valve timing of the intake valve 9 is retarded to the absolute maximum is a reference value "0° CA". Also, the intake valve timing INVT is a value indicative of an advance amount from the maximum retard timing for the valve timing of the intake valve 9. When the internal combustion engine 1 is stopped, the intake valve timing INVT is set to "0° CA", i.e., the maximum retard timing.

Figure 3:
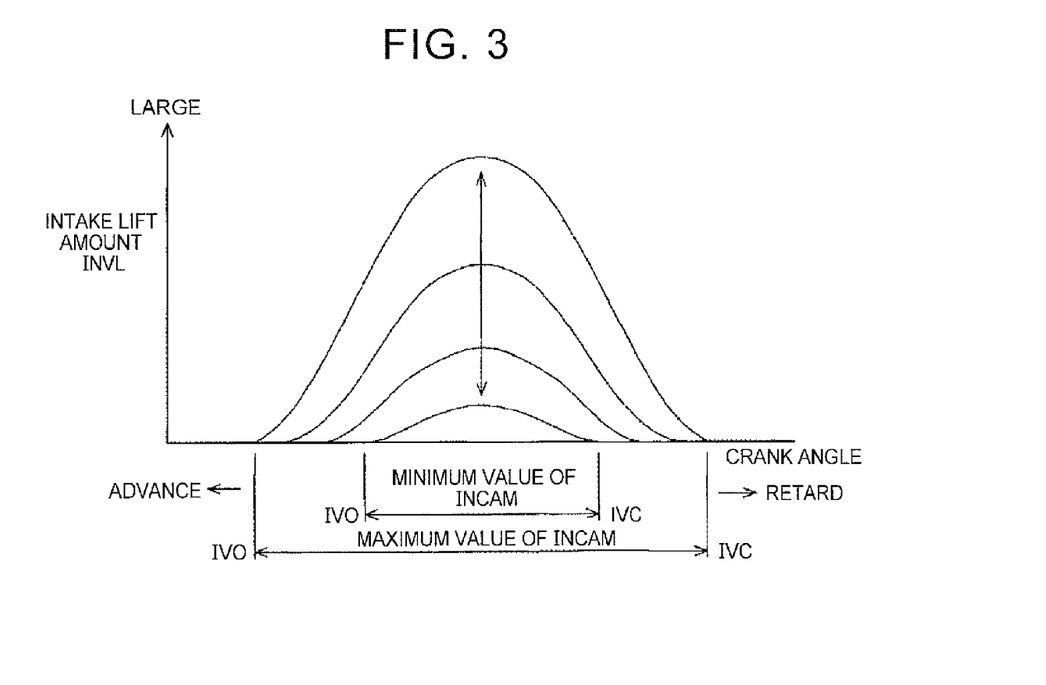
FIG. 3 is a graph showing a maximum lift amount and valve-open period of the intake valve that are changed by an intake variable lift amount mechanism.

As shown in FIG. 3, the intake variable lift amount mechanism 14i is a mechanism that changes an intake lift amount INVL that is the maximum lift amount of the intake valve 9 and the intake valve-open period INCAM in synchronization with each other. The intake valve-open period INCAM also becomes longer as the intake lift amount INVL becomes larger. As shown in FIG. 3, when the intake valve-open period INCAM is increased by the intake variable lift amount mechanism 14i, the intake valve-opening timing IVO of the intake valve 9 is advanced and the intake valve-closing timing IVC is retarded.

An exhaust variable valve mechanism that changes a valve characteristic of the exhaust valve 10 is also provided in the internal combustion engine 1. More specifically, the internal combustion engine 1 includes an exhaust variable valve timing mechanism 13e that changes the valve timing of the exhaust valve 10, and an exhaust variable lift amount mechanism 14e that is driven by an exhaust valve actuator 15e and changes a maximum lift amount and valve-open period of the exhaust valve 10. This exhaust variable lift amount mechanism 14e forms a second variable valve mechanism.

The exhaust variable valve timing mechanism 13e changes an exhaust valve timing EXVT that is the valve timing of the exhaust valve 10, by adjusting a relative rotational phase of the exhaust camshaft 12 with respect to the crankshaft 7.

Figure 4:
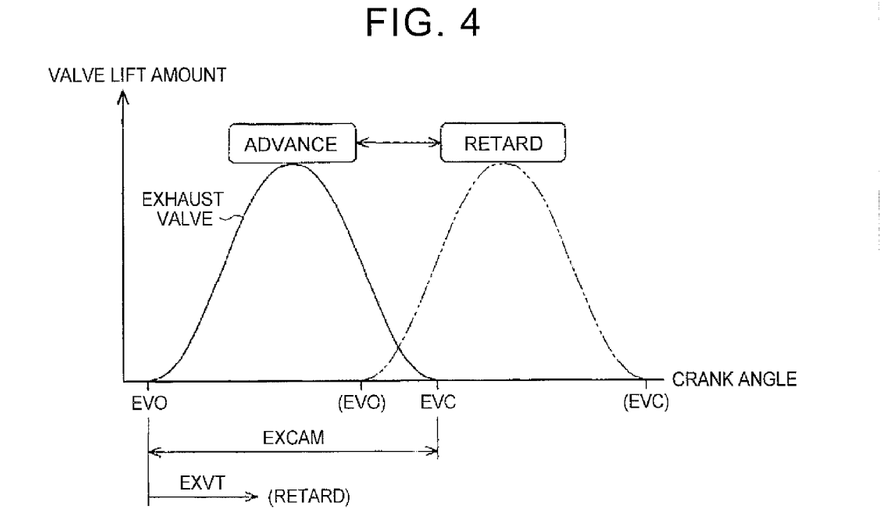
FIG. 4 is a graph showing a valve timing of an exhaust valve that is changed by an exhaust variable valve timing mechanism.

As show in FIG. 4, the exhaust variable valve timing mechanism 13e advances or retards both an exhaust valve-opening timing EVO that is the valve-opening timing of the exhaust valve 10, and an exhaust valve-closing timing EVC that is the valve-closing timing of the exhaust valve 10, while an exhaust valve-open period EXCAM that is the valve-open period of the exhaust valve 10 is kept constant. With the exhaust valve timing EXVT, a state in which the valve timing of the exhaust valve 10 is retarded to the absolute maximum is a reference value "0° CA". Also, the exhaust valve timing EXVT is a value indicative of a retard amount from the maximum advance timing for the valve timing of the exhaust valve 10. When the internal combustion engine 1 is stopped, the exhaust valve timing EXVT is set to "0° CA", i.e., the maximum advance timing.

Figure 5:
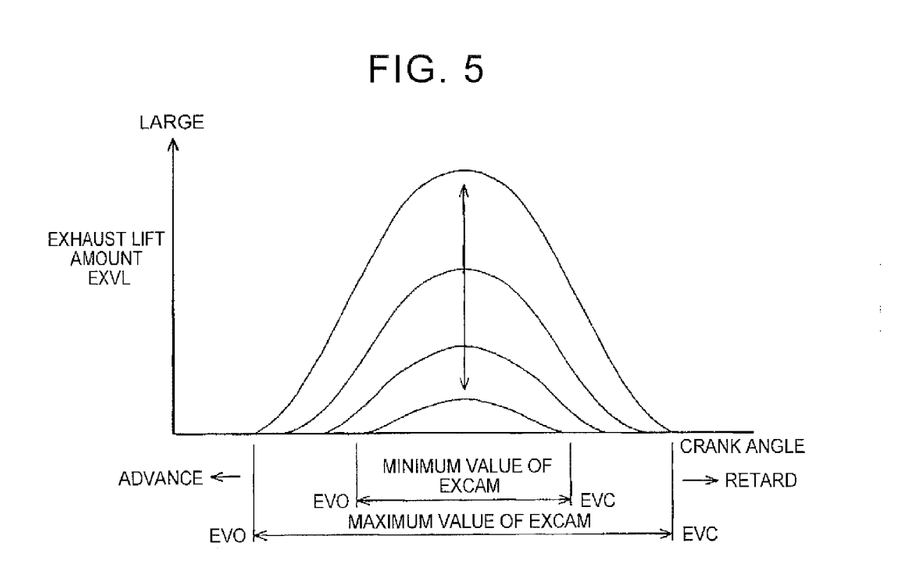
FIG. 5 is graph showing a maximum lift amount and valve-open period of the exhaust valve that are changed by an exhaust variable lift amount mechanism.

As shown in FIG. 5, the exhaust variable lift amount mechanism 14e is a mechanism that changes an exhaust lift amount EXVL that is the maximum lift amount of the exhaust valve 10 and the exhaust valve-open period EXCAM in synchronization with each other. The exhaust valve-open period EXCAM also becomes longer as the exhaust lift amount EXVL becomes larger. Also, when the exhaust valve-open period EXCAM is increased by the exhaust variable lift amount mechanism 14e, the exhaust valve-opening timing EVO of the exhaust valve 10 is advanced and the exhaust valve-closing timing EVC is retarded.

Various controls of the internal combustion engine 1 are performed by a control unit 26 as a control portion. The control unit 26 includes a CPU that executes calculations, ROM in which programs and data necessary for the controls are stored, RAM in which the calculation results of the CPU are temporarily stored, and ports for inputting and outputting signals with respect to external devices, and the like.

Various sensors and the like that detect an engine operating state and the like are provided in the internal combustion engine 1. For example, an accelerator operation amount sensor 28 detects an operation amount (accelerator operation amount ACCP) of an accelerator pedal 27. A throttle sensor 29 detects an opening (throttle opening TA) of a throttle valve 20 provided in the intake passage 3. A water temperature sensor 30 detects a temperature (coolant temperature THW) of coolant of the internal combustion engine 1. An oil temperature sensor 31 detects a temperature (oil temperature THO) of lubricating oil of the internal combustion engine 1. An intake air temperature sensor 32 detects a temperature (intake air temperature THA) of intake air. An airflow meter 33 detects an amount (intake air amount GA) of air drawn into the combustion chamber 2 through the intake passage 3. A crank position sensor 34 detects a rotation angle of the crankshaft 7 necessary to calculate an engine speed NE. An intake cam position sensor 35i detects a rotational phase of the intake camshaft 11. An intake driving amount sensor 36i detects a driving amount of the intake valve actuator 15i necessary to detect the intake lift amount INVL and the intake valve-open period INCAM. An exhaust cam position sensor 35e detects a rotational phase of the exhaust camshaft 12. An exhaust driving amount sensor 36e detects a driving amount of the exhaust valve actuator 15e necessary to detect the exhaust lift amount EXVL and the exhaust valve-open period EXCAM. The existence of an engine start request and an engine stop request is detected by an operating state of an ignition switch (hereinafter, referred to as IG switch) 37 being input to the control unit 26. That is, when the IG switch 37 is turned on, the control unit 26 determines that there is an engine start request, and when the IG switch 37 is turned off, the control unit 26 determines that there is an engine stop request.

The control unit 26 ascertains the engine operating state based on the detection signals from the various sensors and the like, and performs various controls according to the ascertained engine operating state. For example, the control unit 26 performs fuel injection control of the fuel injection valve 4, ignition timing control of the spark plug 5, control of the intake valve timing INVT and intake lift amount INVL and the intake valve-open period INCAM by the intake variable valve mechanism, control of the exhaust valve timing EXVT and the exhaust lift amount EXVL and the exhaust valve-open period EXCAM by the exhaust variable valve mechanism, and opening control of the throttle valve 20, and the like.

Also, the control unit 26 also performs automatic stop control that automatically stops the internal combustion engine 1 when a preset automatic stop condition is satisfied, and automatic start control that automatically starts the internal combustion engine 1 when a preset automatic start condition is satisfied.

However, if the temperature of the internal combustion engine 1 is high when the engine starts, abnormal combustion such as knocking or pre-ignition may occur.

Figure 6:
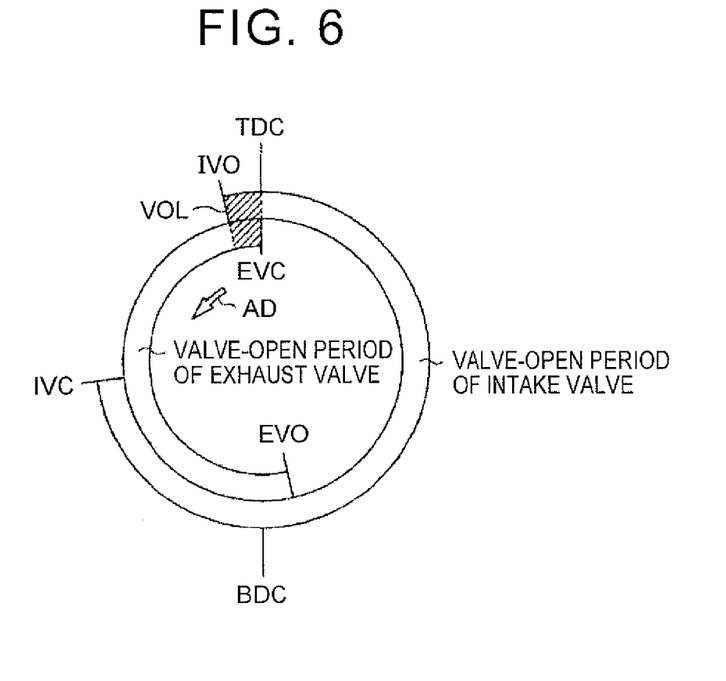
FIG. 6 is an explanatory view showing a valve overlap amount of the intake valve and the exhaust valve.

If the valve-open period of the intake valve 9 is increased and the intake valve-closing timing IVC is retarded, or more specifically, the intake valve-closing timing IVC is retarded beyond intake bottom dead center and the actual compression ratio is reduced, as shown in FIG. 6, the temperature of the intake air compressed inside the cylinder will drop, so the occurrence of this kind of abnormal compression can be inhibited.

However, if the valve-open period of the intake valve 9 is increased, the intake valve-opening timing IVO will advance, so the valve overlap amount VOL of the intake valve 9 and the exhaust valve 10 will increase and the internal EGR amount will increase. If the engine stops while the internal EGR amount in the cylinder is large, the startability the next time that the engine is started may deteriorate. Therefore, if the exhaust valve timing EXVT is changed in the advance direction, and the exhaust valve-closing timing EVC is advanced, as shown by arrow AD in FIG. 6, the increase in the valve overlap amount VOL can be inhibited.

Here, if the exhaust valve timing EXVT is advanced, the exhaust valve-opening timing EVO will also advance, so there is a possibility that the exhaust valve 10 will open during the expansion stroke. If the exhaust valve 10 opens during the expansion stroke in this way, the energy efficiency that is the ratio of energy that can be used as output of the engine, from among the energy generated by the combustion of the air-fuel mixture, will decrease. This decrease in the energy efficiency will end up adversely affecting fuel efficiency and the like, for example.

Figure 7:
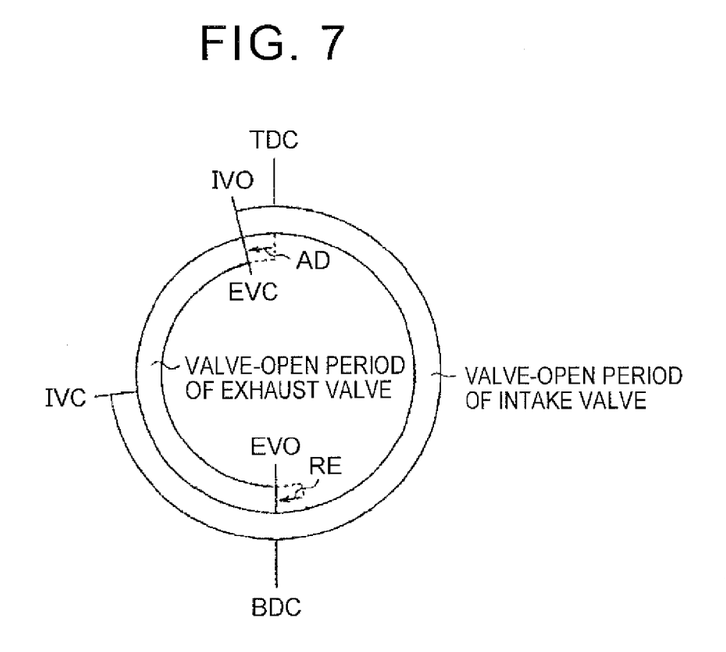
FIG. 7 is an explanatory view showing a valve overlap amount of the intake valve and the exhaust valve and a valve-opening timing of the exhaust valve.

Therefore, when there is a possibility of abnormal combustion occurring when the engine starts, the control unit 26 inhibits the occurrence of abnormal combustion and a deterioration of startability, as well as inhibits a decrease in the energy efficiency of the engine, by placing the valve characteristic before the engine stops in the state shown in FIG. 7.

As shown in FIG. 7, when there is a possibility of abnormal combustion occurring, the control unit 26 increases the valve-open period of the intake valve 9 and reduces the valve-open period of the exhaust valve 10, compared to the valve-open period normally set when the engine stops. By increasing the valve-open period of the intake valve 9 and largely retarding the intake valve-closing timing IVC in this way, the occurrence of abnormal combustion described above is able to be inhibited. On the other hand, when the valve-open period of the exhaust valve 10 is reduced, the exhaust valve-closing timing EVC of the exhaust valve will be advanced as shown by arrow AD in FIG. 7, and the exhaust valve-opening timing EVO will be retarded as shown by arrow RE in FIG. 7. Therefore, unlike a case in which the exhaust valve timing EXVT is changed in the advance direction, the exhaust valve-closing timing EVC is able to be advanced without advancing the exhaust valve-opening timing EVO. Therefore, an increase in the valve overlap amount VOL when increasing the valve-open period of the intake valve 9 is inhibited by the advancing of the exhaust valve-closing timing EVC, and as a result, deterioration of startability due to the internal EGR amount is able to be inhibited. Also, a state in which the exhaust valve 10 opens during the expansion stroke is inhibited by the retarding of the exhaust valve-opening timing EVO, and as a result, a decrease in the energy efficiency of the engine is also able to be inhibited.

Figure 8:
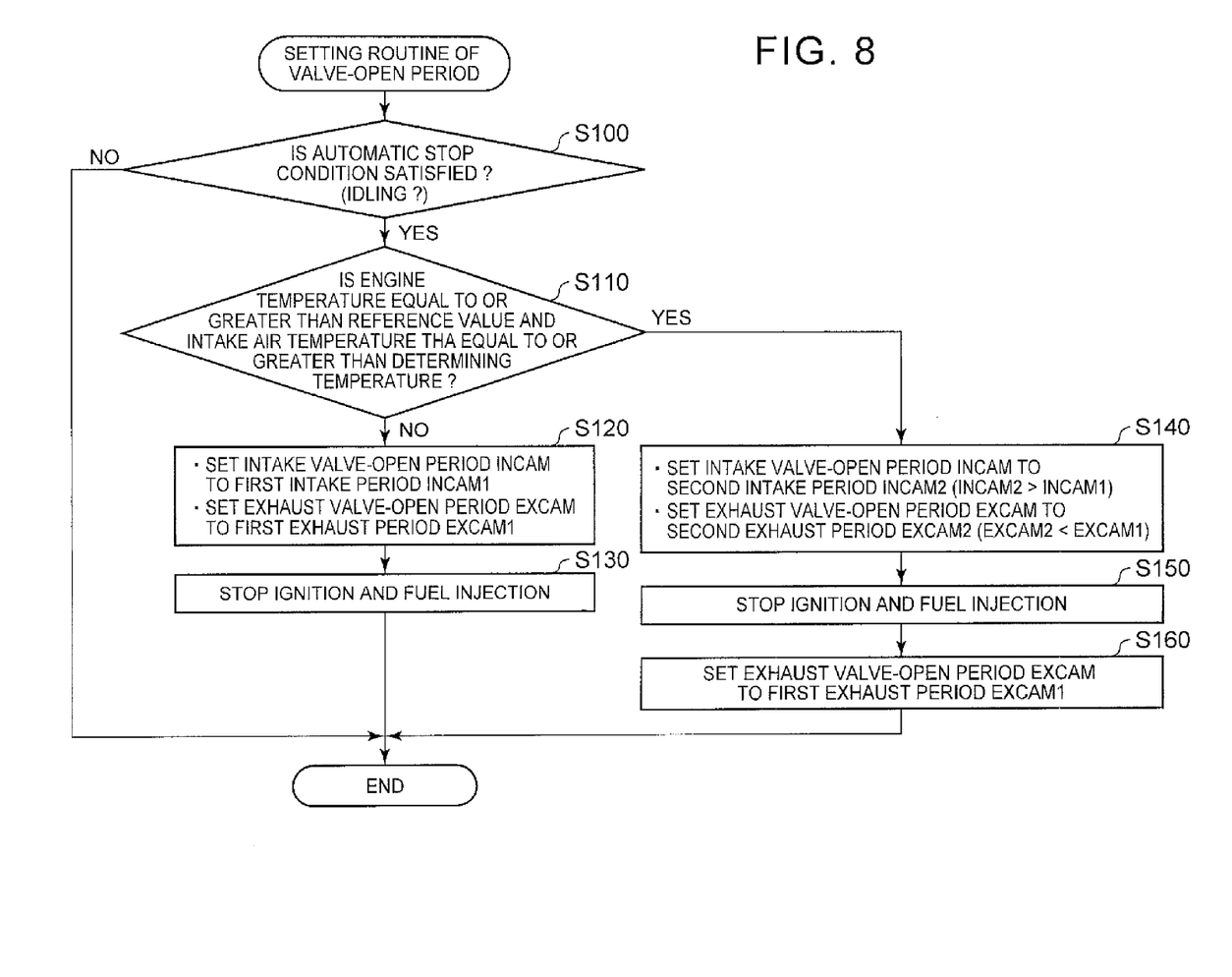
FIG. 8 is a flowchart illustrating the flow of a setting routine of a valve-open period.

Next, a routine for setting the valve-open period when stopping the engine to the state shown in FIG. 7 earlier, when there is a possibility of an abnormality occurring, will be described. This setting routine of the valve-open period is executed at predetermined cycles by the control unit 26.

When the routine starts, the control unit 26 determines whether the automatic stop condition is satisfied (S100). The condition below or the like is set as this automatic stop condition, for example.

The accelerator operation amount ACCP is "0", and the operating state of the internal combustion engine 1 is an idling state.

The internal combustion engine 1 is not cold. The determination of whether the internal combustion engine 1 is cold may be made based on the coolant temperature THW and the oil temperature THO.

The intake air temperature THA is a temperature suitable to start the engine.

The control unit 26 determines that the automatic stop condition is satisfied when all of the automatic stop conditions are satisfied. Also, when the automatic stop condition is satisfied, the control unit 26 determines that there is an automatic stop request.

In step S100, when the automatic stop condition is not satisfied (S100: NO), the control unit 26 temporarily ends the routine.

On the other hand, in step S100, when the automatic stop condition is satisfied (S100: YES), the control unit 26 determines whether the temperature of the internal combustion engine 1 is equal to or higher than a reference value, and the intake air temperature THA is equal to or higher than a determining temperature (S110). In this step S110, whether there is a possibility of abnormal combustion occurring with the normally set valve-open period (a first intake period INCAM1 and first exhaust period EXCAM1 that will be described later) is determined based on the engine temperature and the intake air temperature THA. For the reference value described above, an engine temperature at which there is a possibility of abnormal combustion such as knocking and pre-ignition occurring may be set. Here, as is well known, the engine temperature has a correlative relationship with the coolant temperature THW and the oil temperature THO. Therefore, in step S110, the control unit 26 determines that the temperature of the internal combustion engine 1 is equal to or higher than the reference value when the coolant temperature THW and the oil temperature THO are each equal to or greater than a preset determining temperature. Also, even if the engine temperature is high, if the intake air temperature drops, abnormal combustion will tend not to occur. Therefore, in step S110, the determination accuracy regarding the possibility of abnormal combustion occurring is increased by determining whether the intake air temperature THA is a temperature that is equal to or higher than a preset determining temperature and there is a possibility of abnormal combustion occurring, in addition to a high temperature determination of the engine temperature based on the coolant temperature THW and the oil temperature THO.

In step S110, when it is determined that the coolant temperature THW or the oil temperature THO is lower than a respective preset determining temperature and the temperature of the internal combustion engine 1 is lower than the reference value, or when the intake air temperature THA is lower than the determining temperature (S100: NO), abnormal combustion will not occur even if the normal valve-open period is set. Therefore, the control unit 26 sets the intake valve-open period INCAM to the first intake period INCAM1 that is the normally set valve-open period, through driving control of the intake variable lift amount mechanism 14i, and sets the exhaust valve-open period EXCAM to the first exhaust period EXCAM1 that is the normally set valve-open period, through driving control of the exhaust variable lift amount mechanism 14e (S120).

For the first intake period INCAM1, a valve-open period suitable to start the engine is set. For example, a valve-open period that enables a sufficient amount of intake air to be introduced into the combustion chamber when the engine is started, or the like, may be set. Also, for the first exhaust period EXCAM1 as well, a valve-open period suitable to start the engine is set. For example, a valve-open period that enables the valve overlap amount when the engine is started to be reduced as much as possible may be set, when the first intake period INCAM1 is set.

When the first intake period INCAM1 and the first exhaust period EXCAM1 are set in this way, the control unit 26 stops ignition and fuel injection according to the automatic stop request, and actually automatically stops the internal combustion engine 1 (S130). Then, the control unit 26 temporarily ends the routine.

On the other hand, in step S110, when it is determined that the coolant temperature THW and the oil temperature THO are each equal to or higher than the preset determining temperature and the temperature of the internal combustion engine 1 is equal to or higher than the reference value, and the intake air temperature THA is equal to or higher than the determining temperature (S100: YES), there is a possibility of abnormal combustion occurring if the normal valve-open period (the first intake period INCAM1 and the first exhaust period EXCAM1 described above) is set. Therefore, the control unit 26 sets the intake valve-open period INCAM to a second intake period INCAM2 that is longer than the first intake period INCAM1, through driving control of the intake variable lift amount mechanism 14i, and sets the exhaust valve-open period EXCAM to a second exhaust period EXCAM2 that is shorter than the first exhaust period EXCAM1, through driving control of the exhaust variable lift amount mechanism 14e (S140).

The period of the second intake period INCAM2 is set such that the actual compression ratio will become lower than when the intake valve-open period INCAM is set to the first intake period INCAM1. In this example embodiment, the value of the second intake period INCAM2 is set such that the valve-opening timing of the intake valve 9 is a timing that is greatly retarded from intake bottom dead center, compared to when the intake valve-open period INCAM is set to the first intake period INCAM1. Here, if the intake valve-open period INCAM is increased by the intake variable lift amount mechanism 14i as described above, intake valve-opening timing IVO is advanced and the intake valve-closing timing IVC is retarded. Therefore, in order to retard the intake valve-closing timing IVC, the value of the second intake period INCAM2 is set to a larger value than the value of the first intake period INCAM1.

Also, the period of the second exhaust period EXCAM2 is set such that an increase in the valve overlap amount when the intake valve-open period INCAM is set to the second intake period INCAM2 is able to be inhibited. That is, the second intake period INCAM2 is a valve-open period that is longer than the first intake period INCAM1. Here, if the intake valve-open period INCAM is increased as described above, the intake valve-opening timing IVO of the intake valve 9 is advanced and the intake valve-closing timing IVC is retarded. Therefore, if the intake valve-open period INCAM is set to the second intake period INCAM2, the intake valve-opening timing IVO is advanced compared to when the intake valve-open period INCAM is set to the first intake period INCAM1, so the valve overlap amount VOL will increase. Therefore, the period of the second exhaust period EXCAM2 is set such that this increase in the valve overlap amount is able to be inhibited. For example, the value of the second exhaust period EXCAM2 is set such that the exhaust valve-closing timing EVC is advanced more compared to when the exhaust valve-open period EXCAM is set to the first exhaust period EXCAM1. When the exhaust valve-open period EXCAM is increased by the exhaust variable lift amount mechanism 14e as described above, the exhaust valve-opening timing EVO is advanced and the exhaust valve-closing timing EVC is retarded. Therefore, in order to advance the exhaust valve-closing timing EVC, the value of the second exhaust period EXCAM2 is set to a value that is smaller than the value of the first exhaust period EXCAM1.

When the second intake period INCAM2 and the second exhaust period EXCAM2 are set in this way, the control unit 26 stops ignition and fuel injection according to the automatic stop request, and actually automatically stops the internal combustion engine 1 (S150).

Next, the control unit 26 sets the exhaust valve-open period EXCAM to the first exhaust period EXCAM1, through driving control of the exhaust variable lift amount mechanism 14e (S160). By the process of this step S160, the exhaust valve-open period EXCAM is changed from the second exhaust period EXCAM2 to the first exhaust period EXCAM1 after fuel injection stops. Then, the control unit 26 temporarily ends the routine.

By this setting routine, the intake valve-open period INCAM and the exhaust valve-open period EXCAM set when the engine stops are maintained until the next time the engine is started.

Next, the operation obtained by the control unit 26 of this example embodiment will be described.

When the operating state of the internal combustion engine 1 changes from an idling state to an engine stopped state, and then the internal combustion engine 1 is started, there is a possibility of abnormal combustion such as knocking or pre-ignition occurring when the temperature of the internal combustion engine is high. Therefore, the control unit 26 sets the intake valve-open period INCAM to the second intake period INCAM2 in preparation for restarting the engine after it is stopped, when it is determined by the processes in step S100 and step S110 that the internal combustion engine 1 is idling with the temperature of the internal combustion engine 1 equal to or higher than the reference temperature. That is, the control unit 26 increases the intake valve-open period INCAM to longer than the first intake period INCAM1 that is set during normal operation. When the valve-open period of the intake valve 9 is increased in this way, the valve-opening timing of the intake valve 9 is retarded, so the actual compression ratio when the engine is restarted is able to be lowered, and as a result, the occurrence of abnormal combustion when the engine is started is able to be suppressed.

Here, when the valve-open period of the intake valve 9 is increased during idling, the internal EGR amount will increase due to the valve overlap amount increasing. If the engine is stopped while the internal EGR amount is large in this way, startability may deteriorate when the engine is started the next time. Regarding this, when the control unit 26 increases the valve-open period of the intake valve 9, it sets the exhaust valve-open period EXCAM to the second exhaust period EXCAM2. That is, the control unit 26 reduces the exhaust valve-open period EXCAM to shorter than the first exhaust period EXCAM1 that is set during normal operation. Therefore, deterioration in startability due to an increase in the valve overlap amount is also able to be inhibited, as was described using FIG. 7 above.

Also, when reducing the valve-open period of the exhaust valve 10 to shorter than the first exhaust period EXCAM1 that is set during normal operation, by setting the exhaust valve-open period EXCAM to the second exhaust period EXCAM2, the exhaust valve-closing timing EVC is advanced, and the exhaust valve-opening timing EVO is retarded, as shown in FIG. 7 earlier. Therefore, the exhaust valve-closing timing EVC is able to be advanced without advancing the exhaust valve-opening timing EVO. Accordingly, a decrease in the energy efficiency of the engine is able to be inhibited, while inhibiting an increase in the valve overlap amount when increasing the valve-open period of the intake valve 9, as described using FIG. 7 earlier.

Also, when changing a valve characteristic such as the intake lift amount INVL or the intake valve-open period INCAM by the intake variable lift amount mechanism 14i, a load caused by reaction force of the valve spring 16i that urges the intake valve 9 in the valve-closing direction acts on the intake variable lift amount mechanism 14i. This load tends to increase as the intake lift amount INVL increases, or as the intake valve-open period INCAM becomes longer, or as the engine speed decreases. Therefore, if the intake valve-open period INCAM is set to the second intake period INCAM2 when the engine speed is at its lowest, i.e., when the engine is stopped by an automatic stop request, and the intake valve-open period INCAM is increased to longer than it is during normal operation, a large load is placed on the intake variable lift amount mechanism 14i. Regarding this, after it is determined that the automatic stop condition is satisfied in step S100 shown in FIG. 8 earlier, the control unit 26 sets the intake valve-open period INCAM to the second intake period INCAM2, and sets the exhaust valve-open period EXCAM to the second exhaust period EXCAM2 in the process in step S140, before stopping ignition and fuel injection in step S150. That is, before fuel injection and the like is stopped by the engine stop request as a result of the automatic stop condition being satisfied, i.e., while the engine is operating after there is a request to stop the engine until operation of the internal combustion engine 1 stops, the control unit 26 increases the intake valve-open period INCAM and reduces the exhaust valve-open period EXCAM. Therefore, the load applied to the intake variable lift amount mechanism 14i is able to be reduced compared to when the process in step S140 is executed after the engine stops.

Also, in the internal combustion engine 1 in which automatic stop and automatic start are performed, the period of time from after the engine is automatically stopped until it is automatically started is often short compared to when the engine is manually restarted after being manually stopped through an operation of the IG switch 37 or the like. Therefore, it is highly likely that the engine will be automatically started before the engine temperature sufficiently drops after the engine is automatically stopped. Accordingly, when starting the engine after the engine has been automatically stopped, it is more likely that the abnormal combustion described above will occur, compared to when the engine has been manually stopped. Regarding this, the control unit 26 performs a process to set the intake valve-open period INCAM to the second intake period INCAM2 and increase the valve-open period of the intake valve 9 to longer than it is during normal operation, when the automatic stop condition of the internal combustion engine 1 is satisfied, i.e., when an automatic stop of the engine is performed. Therefore, the occurrence of abnormal combustion can be appropriately inhibited in the internal combustion engine 1 in which there is a greater possibility of abnormal combustion occurring.

Also, the exhaust valve-open period EXCAM is changed from the second exhaust period EXCAM2 to the first exhaust period EXCAM1 by the control unit 26 performing the process of step S160 shown in FIG. 8 earlier. Therefore, the valve-open period of the exhaust valve 10 when the engine is started is longer than when the exhaust valve-open period EXCAM that has been reduced to shorter than it is during normal operation before fuel injection stops is maintained after fuel injection stops as well. Therefore, exhaust gas resistance when starting the engine is reduced, so startability of the engine improves.

As described above, according to this example embodiment, the effects below are able to be obtained.

(1) The control unit 26 executes a process to increase the valve-open period of the intake valve 9 to longer than the first intake period INCAM1 by setting the intake valve-open period INCAM to the second intake period INCAM2, and reduce the valve-open period of the exhaust valve 10 to shorter than the first exhaust period EXCAM1 by setting the exhaust valve-open period EXCAM to the second exhaust period EXCAM2. Therefore, a decrease in energy efficiency of the engine is able to be inhibited, while inhibiting an increase in valve overlap amount when increasing the valve-open period of the intake valve 9.

(2) The control unit 26 executes a process to increase the valve-open period of the intake valve 9 as described above and reduce the valve-open period of the exhaust valve 10 as described above, when idling with the temperature of the internal combustion engine 1 equal to or higher than the reference value. As a result, the occurrence of abnormal combustion when the engine is started and deterioration of engine startability are able to be inhibited.

(3) The control unit 26 executes a process to increase the valve-open period of the intake valve 9 as described above and reduce the valve-open period of the exhaust valve 10 as described above, before the fuel injection is stopped by the engine stop request. Therefore, the load applied to the intake variable lift amount mechanism 14i is able to be reduced compared to when the same process is executed after the engine is stopped.

(4) The internal combustion engine 1 is an engine in which automatic stop and automatic start are performed, and the control unit 26 executes a process to increase the valve-open period of the intake valve 9 as described above and reduce the valve-open period of the exhaust valve 10 as described above, before fuel injection stops when there is an automatic stop request as the engine stop request. Therefore, in the internal combustion engine 1 in which it is highly likely that abnormal combustion will occur, the occurrence of abnormal combustion is able to be suitably inhibited.

(5) The control unit 26 increases the valve-open period of the exhaust valve 10 to longer than the valve-open period of the exhaust valve 10 that has been reduced by the process described above, after fuel injection has stopped. Therefore, startability of the engine is improved compared to when the valve-open period of the exhaust valve 10 that has been reduced before fuel injection stops is maintained after fuel injection stops as well.

The example embodiment described above may also be carried out by the modes below in which this has been appropriately modified.

In step S110 shown in FIG. 8 earlier, a determination of the intake air temperature THA is also made, but this determination of the intake air temperature THA may also simply be omitted.

In step S130 and step S150 shown in FIG. 8 earlier, ignition and fuel injection are stopped, but ignition may also be stopped after fuel injection is stopped. That is, the stop timings of ignition and fuel injection may be different.

The process of step S160 shown in FIG. 8 earlier may be omitted. Even in this case, the effects described in (1) to (4) above are able to be obtained.

The series of processes shown in FIG. 8 earlier were processes that are executed when there is an automatic stop request of the engine. On the other hand, aside from an automatic stop request, the engine stop request may also be a manual stop request by an operation that turns the IG switch 37 off or the like, for example. Here, a situation in which the IG switch 37 is immediately turned on after being turned off is also conceivable, so even if the engine stop request is a manual stop request, there is a possibility that the abnormal combustion described above will occur, just as with an automatic stop request. Therefore, a series of processes related to the setting of the valve-open period described above may also be executed when there is a manual stop request. The setting routine of the valve-open period in this modified example may be executed by changing a portion of the setting routine shown in FIG. 8 earlier, for example.

Figure 9:
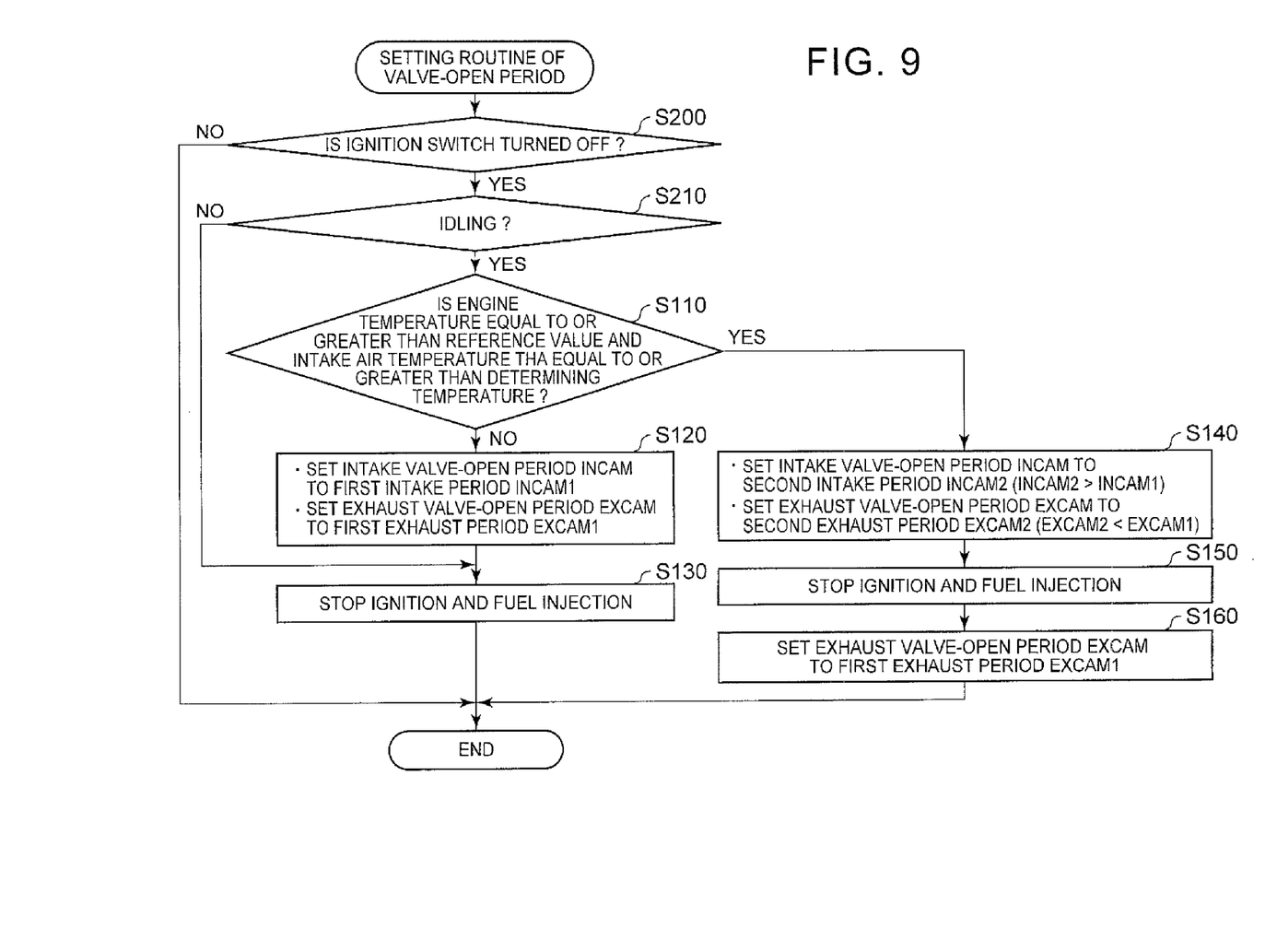
FIG. 9 is a flowchart illustrating a routine when setting the valve-open period in a modified example of the example embodiment.

As shown in FIG. 9, in the setting routine of the valve-open period of this modified example, the process of step S100 shown in FIG. 8 earlier is omitted. Also, the processes of step S200 and step S210 are performed as shown in FIG. 9, before the process of step S110 shown in FIG. 8 is performed. That is, the control unit 26 first determines whether the IG switch 37 has been turned off (S200). Then, when the IG switch 37 has not been turned off (S200: NO), the control unit 26 temporarily ends the routine.

On the other hand, when the IG switch 37 has been turned off (S200: YES), the control unit 26 determines whether the current operating state is one of idling (S210). Then, when it is not one of idling, (S210: NO), the IG switch 37 is turned off when the operating state is one that differs from idling, and there is a manual stop request when the operating state is one other than the normal operating state. Therefore, in order to stop the engine quickly, the control unit 26 stops ignition and fuel injection (S130), and temporarily ends the routine.

On the other hand, when it is one of idling (S210: YES), the control unit 26 executes the processes of step S110 and thereafter described above, just like the setting routine shown in FIG. 8 earlier. With this modified example as well, effects other than (4) described above are able to be obtained.

In the modified example shown in FIG. 9, the process of step S210 may be omitted, and the processes of the next step S110 and thereafter may be performed when the determination in step S200 is positive.

When idling with the temperature of the internal combustion engine 1 equal to or higher than the reference value, the intake valve-open period INCAM is set to the second intake period INCAM2, and the exhaust valve-open period EXCAM is set to the second exhaust period EXCAM2. That is, when idling with the temperature of the internal combustion engine 1 equal to or higher than the reference value, a process is executed to increase the valve-open period of the intake valve 9 and reduce the valve-open period of the exhaust valve 10. However, this process may also be performed in another engine operating state. In other words, it is possible to perform a similar process when inhibiting a decrease in energy efficiency of the engine, while inhibiting an increase in the valve overlap amount when increasing the valve-open period of the intake valve 9. For example, a similar process can be performed also at times such as when there is a desire to increase engine output by inhibiting a decrease in energy efficiency while increasing intake efficiency, such as during high load operation or the like, for example.

In the example embodiment described above, in order to inhibit a decrease in the energy efficiency of the engine, while inhibiting an increase in the valve overlap amount when increasing the valve-open period of the intake valve 9, the valve-open period of the exhaust valve 10 is reduced when increasing the valve-open period of the intake valve 9. Aside from this, the valve-open period and the valve timing may also be changed together. For example, the intake valve-open period INCAM may be increased, the exhaust valve-open period EXCAM may be reduced, and the exhaust valve timing EXVT may be advanced. Also, the intake valve-open period INCAM may be increased, the intake valve timing INVT may be retarded, and the exhaust valve-open period EXCAM may be reduced. Also, the intake valve-open period INCAM may be increased, the intake valve timing INVT may be retarded, the exhaust valve-open period EXCAM may be reduced, and the exhaust valve timing EXVT may be advanced. In each of these modified examples as well, it is possible to inhibit a decrease in energy efficiency of the engine, while inhibiting an increase in the valve overlap amount when increasing the valve-open period of the intake valve 9.

Before the engine actually stops when the internal combustion engine 1 is stopped, the intake valve-open period INCAM is set to the second intake period INCAM2, and the exhaust valve-open period EXCAM is set to the second exhaust period EXCAM2. Aside from this, when the load placed on the intake variable lift amount mechanism 14*i* due to the reaction force of the valve spring 16*i* is sufficiently small, the intake valve-open period INCAM may be set to the second intake period INCAM2, and the exhaust valve-open period EXCAM may be set to the second exhaust period EXCAM2, after the engine has actually stopped, or when the engine is started.

The intake variable lift amount mechanism 14*i* and the exhaust variable lift amount mechanism 14*e* are mechanisms that change the maximum lift amount and valve-open period of the valve, but the invention may similarly be applied when the internal combustion engine 1 is provided with a variable valve mechanism that changes only the valve-open period.

The invention may similarly be applied also to an internal combustion engine not provided with the intake variable valve timing mechanism 13*i* or the exhaust variable valve timing mechanism 13*e*.

DESCRIPTION OF THE REFERENCE NUMERALS

1 . . . INTERNAL COMBUSTION ENGINE, 2 . . . COMBUSTION CHAMBER, 3 . . . INTAKE PASSAGE, 4 . . . FUEL INJECTION VALVE, 5 . . . SPARK PLUG, 6 . . . PISTON, 7 . . . CRANKSHAFT, 8 . . . EXHAUST PASSAGE, 9 . . . INTAKE VALVE, 10 . . . EXHAUST VALVE, 11 . . . INTAKE CAMSHAFT, 12 . . . EXHAUST CAMSHAFT, 13*i* . . . INTAKE VARIABLE VALVE TIMING MECHANISM, 13*e* . . . EXHAUST VARIABLE VALVE TIMING MECHANISM, 14*i* . . . INTAKE VARIABLE LIFT AMOUNT MECHANISM, 14*e* . . . EXHAUST VARIABLE LIFT AMOUNT MECHANISM, 15*i* . . . INTAKE VALVE ACTUATOR, 15*e* . . . EXHAUST VALVE ACTUATOR, 16*i* . . . VALVE SPRING, 16*e* . . . VALVE SPRING, 20 . . . THROTTLE VALVE, 26 . . . ELECTRONIC CONTROL UNIT, 27 . . . ACCELERATOR

PEDAL, 28 . . . ACCELERATOR OPERATION AMOUNT SENSOR, 29 . . . THROTTLE SENSOR, 30 . . . WATER TEMPERATURE SENSOR, 31 . . . OIL TEMPERATURE SENSOR, 32 . . . INTAKE AIR TEMPERATURE SENSOR, 33 . . . AIRFLOW METER, 34 . . . CRANK POSITION SENSOR, 35*i* . . . INTAKE CAM POSITION SENSOR, 35*e* . . . EXHAUST CAM POSITION SENSOR, 36*i* . . . INTAKE DRIVING AMOUNT SENSOR, 36*e* . . . EXHAUST DRIVING AMOUNT SENSOR, 37 . . . IGNITION SWITCH (IG SWITCH).

The invention claimed is:

1. A control apparatus of an internal combustion engine, the internal combustion engine including
    a first variable valve mechanism configured to change a valve-open period of an intake valve, and
    a second variable valve mechanism that changes a valve-open period of an exhaust valve, the control apparatus comprising:
    an electronic control unit configured to control driving of the first variable valve mechanism and the second variable valve mechanism,
    the electronic control unit being configured to execute a process to increase the valve-open period of the intake valve and reduce the valve-open period of the exhaust valve in order to maintain or decrease a valve overlap amount of the intake valve and the exhaust valve and to inhibit an increase in the valve overlap amount of the intake valve and the exhaust valve, and
    the electronic control unit being configured to execute the process when idling at which a temperature of the internal combustion engine is equal to or higher than a reference value.

2. The control apparatus of the internal combustion engine according to claim 1, wherein
    the electronic control unit is configured to execute the process before fuel injection is stopped by an engine stop request.

3. The control apparatus of the internal combustion engine according to claim 2, wherein
    the internal combustion engine is configured such that automatic stop and automatic start are performed; and
    the engine stop request is a request for the automatic stop.

4. The control apparatus of the internal combustion engine according to claim 2, wherein
    the electronic control unit is configured to increase the valve-open period of the exhaust valve to longer than the valve-open period of the exhaust valve that has been reduced by the process, after the fuel injection is stopped.

5. The control apparatus of the internal combustion engine according to claim 1, wherein
    the electronic control unit is configured to i) increase an intake valve-open period, ii) reduce an exhaust valve-open period, and iii) advance an exhaust valve timing.

6. The control apparatus of the internal combustion engine according to claim 1, wherein
    the electronic control unit is configured to i) increase an intake valve-open period, ii) retard an intake valve timing, and iii) reduce an exhaust valve-open period.

7. The control apparatus of the internal combustion engine according to claim 1, wherein
    The electronic control unit is configured to i) increase an intake valve-open period, ii) retard an intake valve timing, iii) reduce an exhaust valve-open period, and iv) advance an exhaust valve timing.

* * * * *